Patented Oct. 23, 1928.

1,688,542

UNITED STATES PATENT OFFICE.

DOUGLAS M. HARRISON, OF DORMONT, PENNSYLVANIA, ASSIGNOR, BY MESNE ASSIGNMENTS, TO McKENZIE MORTAR COMPANY, OF PITTSBURGH, PENNSYLVANIA.

PROCESS OF PREPARING PRODUCT FROM ACETYLENE-PLANT WASTE AND THE LIKE.

No Drawing. Application filed July 5, 1924. Serial No. 724,541.

This invention is an improvement in the process of preparing waste liquor from acetylene plants which is described in the copending application, Serial No. 687,014, filed January 18, 1924.

The chief object of the invention is to produce a base material which is substantially free from deleterious substances, whereby stucco, plaster, mortar, water-proofing and finishing materials may be made from the resultant product; and in addition the secondary products when utilized with cement to form concrete and the like will not have a deleterious effect upon the same, or at least less than that of the equivalent amount of lime, such as streaking or skinning.

Another object of the invention is to produce a material from waste of the general character indicated which will have substantially uniformity of color and which will be free from skin-forming tendencies.

The chief feature of the invention consists in the process of preparing waste of the general character indicated in a manner which will produce a product having substantial uniformity of color and which will be substantially free from certain deleterious substances.

Briefly, the process consists in adding to the waste material a suitable quantity of a substance of such a nature to produce a product having certain characteristics when the mixture is heated and then heating the mixture for producing such a product by driving off certain undesirables and for separating from the mass other undesirables, either by causing the same to rise to the top where it may be skimmed or by causing it to be precipitated to the bottom where it may be drawn; or by securing both forms of separation simultaneously or successively.

Waste sludge from acetylene plants is usually discharged as a creamy liquid, and this liquid is usually collected and the water content evaporates, leaving a dirty grayish product in paste or solid form, depending upon the moisture content. The waste sludge usually is collected in dumps and the dry waste can be readily powered, by rubbing the same between the fingers. When the waste is in this form, it is collected, reduced to a powder, and screened to remove the undesirable products, such as trash and the like. After the desired product is received in a relatively pure and powdered form, a suitable quantity of water is added thereto to form a mass having a consistency a little thinner than paste. To this mass is added a suitable quantity of a suitable substance of such a nature that when the mixture is heated it produces a product having certain characteristics. Calcium chloride has been found to be one of such suitable materials. The mixture is heated to ebullition. There is discharged from the mass certain undesirable materials which pass off in the boiling. Other undesirable materials collect upon the top of the mass and are skimmed therefrom. Certain other undesirable materials are precipitated to the bottom of the mass and are drawn therefrom, leaving the mass in relatively pure state. The resultant product is of a paste-like consistency and of a uniform gray color, which upon drying assumes a white color.

The resultant product, therefore, is suitable for lime substitution wherever lime is utilized and it will produce a plaster which does not have what is known as a skin effect when the base is prepared as aforesaid. Likewise, since there is secured a base with uniform color, the purchasers, such as the plaster contractors and stucco contractors, can be certain that a predetermined color can always be obtained by the use of the same proportions of pigment and base at any time.

When the waste sludge from the acetylene plant is not in dry form, powdered or unpowdered, the same is in liquid form. This may be received from a storage basin or may be received directly from the plant to a flume pipe or chute. In this event the liquor is put through a screening process to remove the foreign matter, such as trash and the like and the screened liquor is then passed through a dehydrator, which may be of any type, and herein the following form of dehydrator is suggested, since there is little or no cost of operation involved. Such a dehydrator may be of the filter type, either slow or rapid sand, and the same separates from the liquid the water content and discharges the same and retains upon the top of the filter bed the sludge or paste-like precipitate. This paste-like precipitate is then collected in any suitable manner and to the same is added the calcium chloride material and heat is then applied to the material. The calcium chloride-acetylene plant waste mixture is the same, howsoever obtained, so that for the purpose of this invention it is immaterial in what physical form the waste material from the acetylene plant is received.

The resultant material may then be incorporated with other materials as set forth in the co-pending application to which reference has been made previously to form commercially useful products having a high commercial value and which can be produced for a relatively low cost.

The invention claimed is:

1. The process of treating waste carbide sludge material consisting of adding to the material calcium chloride, and heating the calcium chloride mixture to ebullition for driving from the same certain undesirables.

2. The process of treating waste carbide sludge material consisting of adding to the material calcium chloride, heating the mixture to separate the same into a plurality of strata, one of which consists of the resultant desired material, and another of which consists of the undesirable material.

In witness whereof, I have hereunto affixed my signature.

DOUGLAS M. HARRISON.